(12) United States Patent
Chiu et al.

(10) Patent No.: US 8,009,922 B2
(45) Date of Patent: Aug. 30, 2011

(54) IMAGE COMPRESSION/DECOMPRESSION DEVICE AND METHOD THEREOF

(75) Inventors: Chun-Chien Chiu, Taoyuan County (TW); Hsiang-Tan Lin, Keelung (TW); Yue-Li Chao, Taoyuan County (TW); Hui-Chen Lin, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 527 days.

(21) Appl. No.: 12/262,167

(22) Filed: Oct. 30, 2008

(65) Prior Publication Data

US 2010/0034475 A1     Feb. 11, 2010

(30) Foreign Application Priority Data

Aug. 11, 2008   (TW) ................................ 97130537 A

(51) Int. Cl.
*G06K 9/36*     (2006.01)
*G06K 9/46*     (2006.01)
(52) U.S. Cl. ........................................................ 382/233
(58) Field of Classification Search .................. None
See application file for complete search history.

(56) References Cited

U.S. PATENT DOCUMENTS

| 5,293,252 | A | * | 3/1994 | Kim et al. ..................... 382/250 |
| 5,491,761 | A | * | 2/1996 | Kim ............................. 382/251 |
| 6,134,025 | A | * | 10/2000 | Takeuchi et al. ............... 358/1.2 |
| 6,961,150 | B2 | * | 11/2005 | Okuyama ..................... 358/3.12 |
| 7,155,067 | B2 | | 12/2006 | Jayant et al. |
| 2005/0105818 | A1 | | 5/2005 | Hoshi |
| 2006/0152463 | A1 | | 7/2006 | Furihata et al. |

* cited by examiner

*Primary Examiner* — Yuzhen Ge
(74) *Attorney, Agent, or Firm* — Jianq Chyun IP Office

(57) ABSTRACT

An image compression/decompression device and a method thereof are provided. In the method, a first array is generated according to an input image array, and further, a second array is generated by performing an edge detection algorithm according to the input image array. Besides, a plurality of elements of a third array is generated according to the first array. Furthermore, a group of elements of the third array is selected according to the second array. In addition, an average value of the group of elements is computed to obtain an element of an output image array. Each element of the input image array and the third array is M bits, and each element of the first array is N bits, wherein M and N are natural numbers, and M is larger than N. Thereby, the quality of a decompressed image is improved.

13 Claims, 6 Drawing Sheets

US 8,009,922 B2

IMAGE COMPRESSION/DECOMPRESSION DEVICE AND METHOD THEREOF

CROSS-REFERENCE TO RELATED APPLICATION

This application claims the priority benefit of Taiwan application serial no. 97130537, filed on Aug. 11, 2008. The entirety of the above-mentioned patent application is hereby incorporated by reference herein and made a part of this specification.

BACKGROUND OF THE INVENTION

1. Field of the Invention

The present invention relates to a compression/decompression technique, in particular, to an image compression/decompression technique.

2. Description of Related Art

In the field of liquid crystal display (LCD) technology, overdriving technique is usually applied in improving the responding time of liquid crystal. To apply the said overdriving technique, a memory unit needs to be disposed in the LCD, so as to store image data for comparison. Detailed descriptions and drawings of the LCD overdriving technique are provided below.

FIG. 1 illustrates a schematic view of an overdriving device of a LCD. Referring to FIG. 1, a memory unit 100 is used for storing a current frame and providing a previous frame to an overdriving unit 110. The overdriving unit 110 may compensate the current frame based on the previous frame, and thereby generate an output frame. To be more specific, the overdriving unit 110 may receive the frames of the current period and the previous period, and generate the output frame according to a Lookup Table.

It is noted that the trend in the LCD industry is to develop LCD with large-sized panel and high-resolution images. The frame data to be stored in the memory unit 100 is becoming larger. As a consequence, the capacity of the memory unit 100 needs to be increased. Inevitably, the costs for producing the LCD are greatly increased as well.

To keep down the costs, a conventional technique has been provided for reducing the data size of a frame. Referring to FIG. 1, this technique is to divide a gray-scale value of each pixel in the frame into a plurality of most significant bits (called MSB hereafter) and a plurality of least significant bits (called LSB hereafter).

More specifically, provided that the gray-scale value of each pixel in the frame is 8 bits, the preceding 4 bits may be considered as the MSB and the succeeding 4 bits may be considered as the LSB. The memory unit 100 may store only the 4 MSB of each pixel in the frame and omit the 4 LSB. Because the gray-scale values of the 4 LSB are 0000~1111 (0~15 in decimal system), omission of the 4 LSB would make the error range of the gray-scale value of each pixel in the frame fall between 0~15. Accordingly, if 5 LSB are omitted, the error range of the gray-scale value would be between 0~31. In other words, the data size of the frame would be reduced if more LSB are omitted. However, the error range of the frame would be increased correspondingly.

SUMMARY OF THE INVENTION

The present invention provides an image compression/decompression method for improving the quality of a decompressed image.

The present invention provides an image compression/decompression device for reducing a data size of an image and improving the quality of a decompressed image.

The present invention provides an image compression/decompression method which comprises generating a first array according to an input image array and generating a second array by performing an edge detection algorithm according to the input image array. Further, each element of the third array is generated according to the first array. In addition, a group of elements of the third array is selected according to the second array. Furthermore, an average value of the group of elements is computed to obtain an element of an output image array, wherein each element of the input image array is M bits, each element of the third array is M bits, each element of the first array is N bits, M and N are natural numbers, and M is larger than N.

In an embodiment of the present invention, the step of generating the first array according to the input image array comprises performing an addition operation on the input image array and a fourth array to obtain a fifth array. Further, the first array is generated according to N most significant bits of a plurality of elements of the fifth array, wherein each element of the fourth array is (M−N) bits and each element of the fifth array is M bits. In another embodiment, each element of the second array is one bit.

In an embodiment of the present invention, the step of generating each element of the third array according to the first array comprises generating N most significant bits of each element of the third array according to the first array and generating M−N least significant bits of each element of the third array according to a sixth array.

In an embodiment of the present invention, the step of selecting the group of elements of the third array according to the second array comprises excluding each corresponding element from the group of elements when a discrepancy between each element of the third array and a specific element of the third array reaches a predetermined value, wherein the specific element corresponds to the element of the output image array. In another embodiment, the predetermined value is $2^{(M-N)}$. In yet another embodiment, the numbers of the elements of the input image array, the first array, the second array, and the third array are $2^{(M-N)}$.

From another aspect, the present invention provides an image compression/decompression device, comprising an encoder and a decoder. The encoder is for receiving the input image array and includes a downscaling unit and an edge unit. The downscaling unit may generate the first array according to the input image array. The edge unit generates the second array by performing the edge detection algorithm according to the input image array. The decoder includes an upscaling unit, a selection unit, and a computing unit. The decoder is for receiving the first array and the second array. The upscaling unit may generate a plurality of elements of the third array according to the first array. The selection unit is coupled to the upscaling unit and selects a group of elements of the third array according to the second array. The computing unit is coupled to the selection unit for computing an average value of the group of elements to obtain an element of the output image array, wherein each element of the input image array is M bits, each element of the third array is M bits, each element of the first array is N bits, M and N are natural numbers, and M is larger than N.

In an embodiment of the present invention, the image compression/decompression device further comprises a storage unit. The storage unit is coupled to the encoder and the decoder for storing the first array and the second array output by the encoder and providing the first array and the second array to the decoder.

In an embodiment of the present invention, the image compression/decompression device further comprises a transmission path. The transmission path is coupled to the encoder and the decoder for transmitting the first array and the second array provided by the encoder to the decoder.

In the present invention, during a compression process, the first array is generated according to the input image array, and the second array is generated by performing the edge detection algorithm according to the input image array. Additionally, during a decompression process, each element of the third array is generated according to the first array, a group of elements of the third array is selected according to the second array, and an average value of the group of elements is computed so as to obtain the element of the output image array. Thereby, the quality of a decompressed image is improved.

To make the aforesaid features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

First Embodiment

Figure 1:
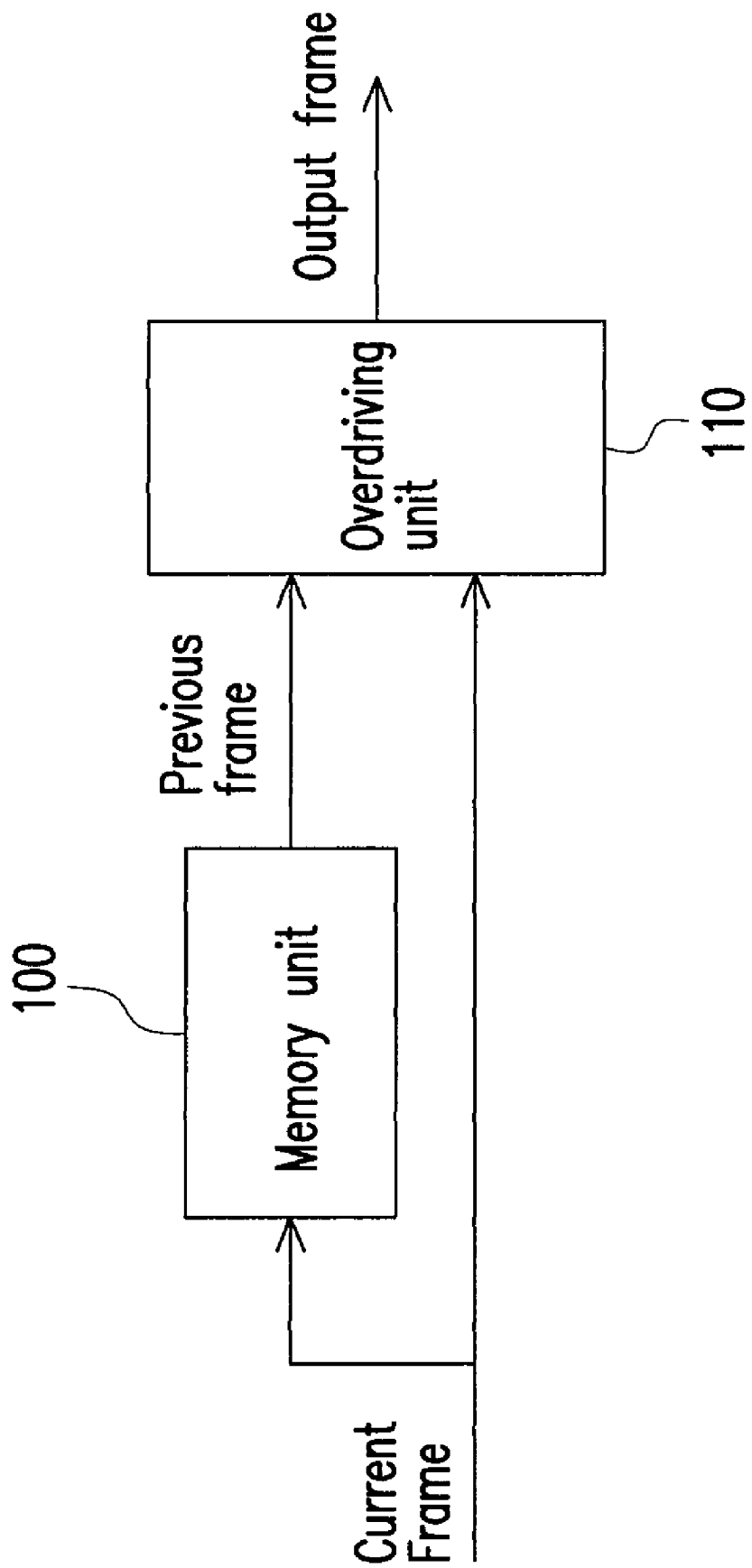
FIG. 1 illustrates a schematic view of an overdriving device of a liquid crystal display.
Figure 2:
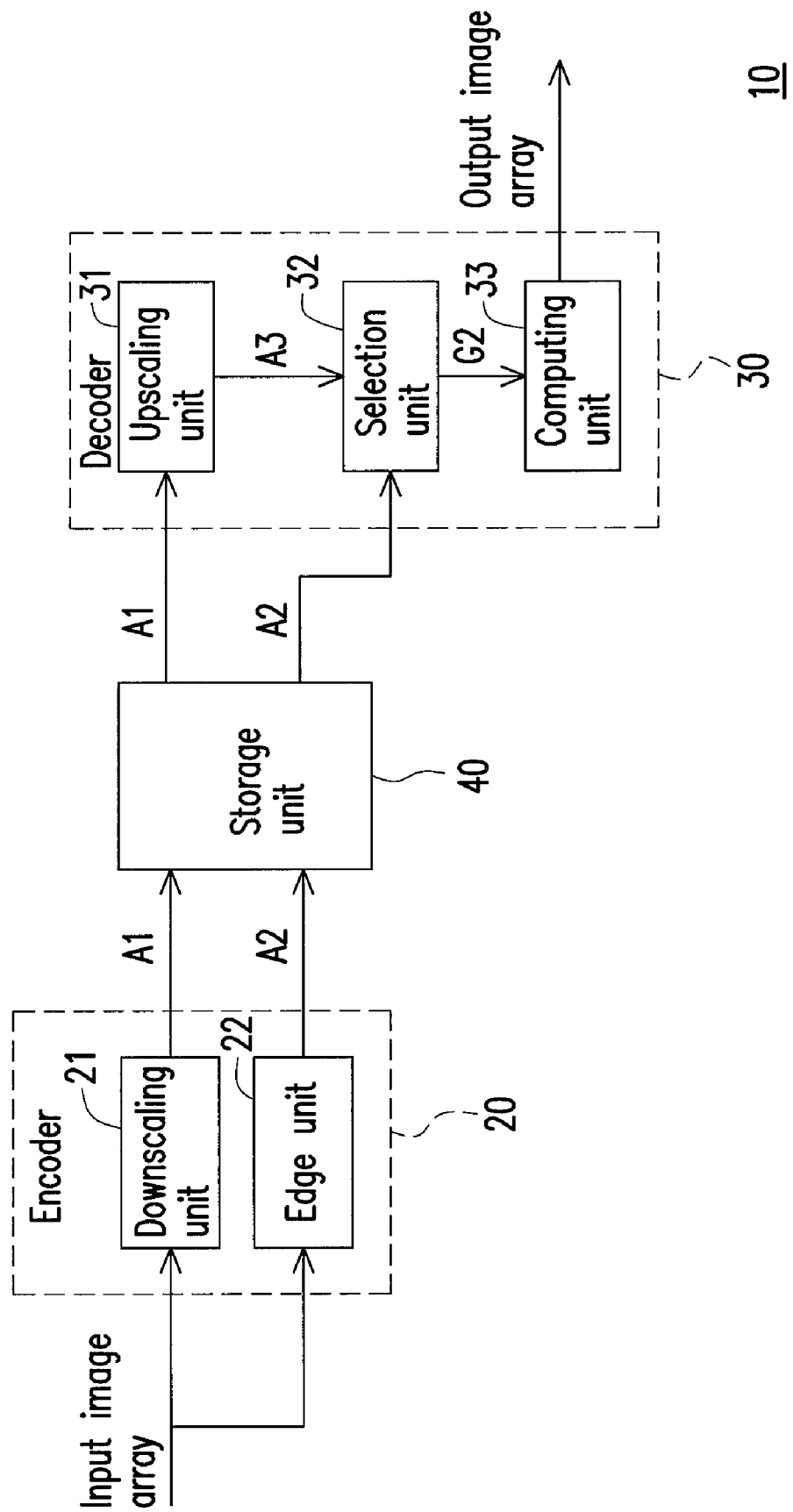
FIG. 2 illustrates a schematic view of an image compression/decompression device according to the first embodiment of the present invention.

FIG. 2 illustrates a schematic view of an image compression/decompression device according to the first embodiment of the present invention. Referring to FIG. 2, an image compression/decompression device 10 comprises an encoder 20, a decoder 30, and a storage unit 40. The encoder 20 may comprise a downscaling unit 21 and an edge unit 22. The decoder 30 may comprise an upscaling unit 31, a selection unit 32, and a computing unit 33. The storage unit 40 is, for example, a frame buffer.

The encoder 20 is for receiving an input image array and the downscaling unit 21 may generate an array A1 according to the input image array. Further, the edge unit 22 may generate an array A2 by performing an edge detection algorithm according to the input image array. The storage unit 40 may be used for storing the arrays A1 and A2.

Additionally, the decoder 30 may be used for receiving the arrays A1 and A2, and the upscaling unit 31 may generate an array A3 according to the array A1. The selection unit 32 may select a group of elements G1 (not shown) of the array A3 according to the array A2. The computing unit 33 may be used to compute an average value of the group of elements G1, so as to obtain an element of an output image array. The element mentioned in this embodiment may be a gray-scale value of a pixel in a frame, for example.

Figure 3:
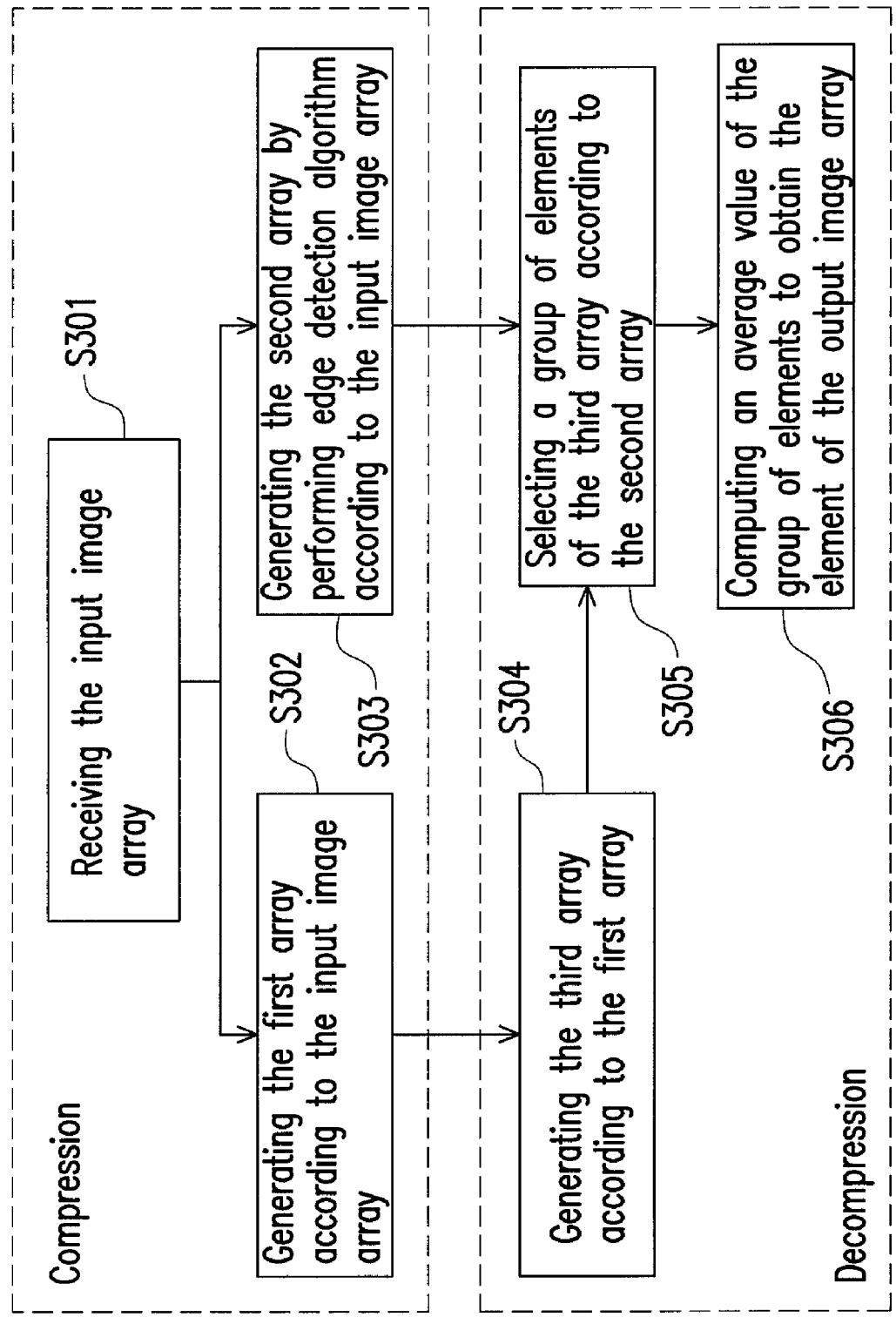
FIG. 3 illustrates a process flow of an image compression/decompression method according to the first embodiment of the present invention.

FIG. 3 illustrates a process flow of an image compression/decompression method according to the first embodiment of the present invention. Referring to FIGS. 2 and 3, in this embodiment, each element of the input image array is 8 bits, elements of the arrays A1 and A3 are respectively 4 and 8 bits, and each element of the array A2 is 1 bit, for instance. According to this embodiment, the image compression/decompression method includes Steps S301~S306, wherein Steps S301~S303 belong to an image compression method and Steps S304~S306 belong to an image decompression method. The image compression method is described in detail as follows.

First, the encoder 20 receives the input image array in Step S301, wherein the input image array may be a block in the frame. In this embodiment, the input image array is, for example, a 4×4 array, as shown in Table 1.

TABLE 1

| Input image array (decimal system) | | | |
| --- | --- | --- | --- |
| 180 | 240 | 240 | 240 |
| 180 | 180 | 240 | 240 |
| 240 | 180 | 180 | 240 |
| 240 | 240 | 180 | 180 |
| Input image array (binary system) | | | |
| 10110100 | 11110000 | 11110000 | 11110000 |
| 10110100 | 10110100 | 11110000 | 11110000 |
| 11110000 | 10110100 | 10110100 | 11110000 |
| 11110000 | 11110000 | 10110100 | 10110100 |

Figures 4, 5:
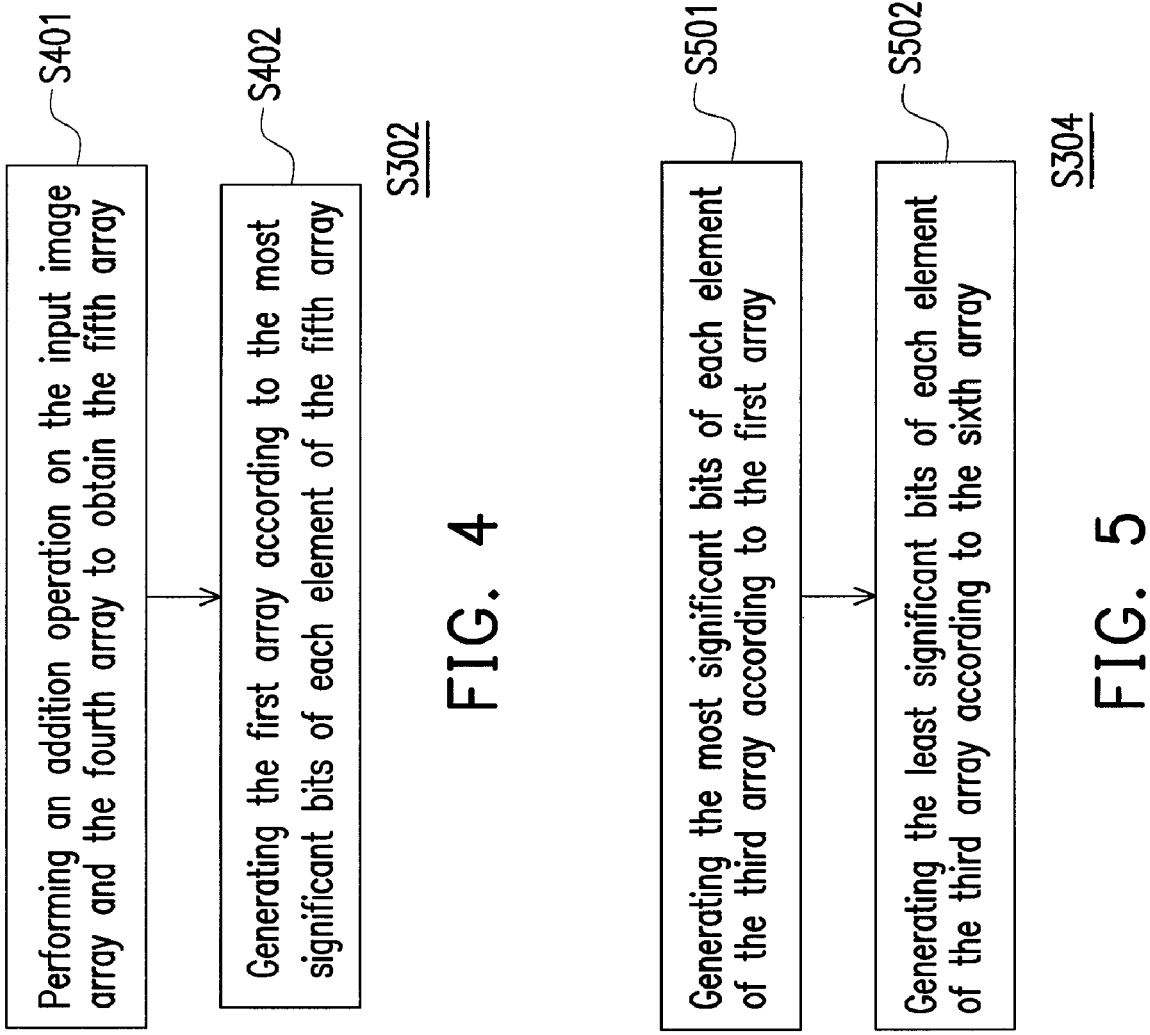
FIG. 4 illustrates the steps of generating a first array based on an input image array according to the first embodiment of the present invention.
FIG. 5 illustrates the steps of generating a third array based on the first array according to the first embodiment of the present invention.

Next, in Step S302, the downscaling unit 21 downscales the input image array into the array A1, so as to reduce a data size of the input image array. The downscaling unit 21 may properly compensate the input image array to reduce an error range when downscaling the input image array. For instance, the downscaling unit 21 may apply a dither algorithm when downscaling the input image array, so as to reduce the error range. FIG. 4 illustrates the steps of generating a first array based on the input image array according to the first embodiment of the present invention. Referring to FIGS. 2, 3, and 4, in Step S401, the downscaling unit 21 may perform an addition operation on the input image array and an array A4 (not shown) to obtain an array A5 (not shown). In this embodiment, the array A4 is illustrated by Table 2. Thereby, the array A5 as shown in Table 3 is obtained. Persons skilled in the art should know that the array A4 shown in Table 2 is merely one embodiment of the present invention. In other embodiments, they may define the array A4 according to their requirements.

TABLE 2

Array A4 (decimal system)

| 0 | 8 | 2 | 10 |
|---|---|---|----|
| 12 | 3 | 14 | 6 |
| 7 | 11 | 1 | 9 |
| 15 | 4 | 13 | 5 |

Array A4 (binary system)

| 0000 | 1000 | 0010 | 1010 |
|------|------|------|------|
| 1100 | 0011 | 1110 | 0110 |
| 0111 | 1011 | 0001 | 1001 |
| 1111 | 0100 | 1101 | 0101 |

TABLE 3

Array A5 (decimal system)

| 180 | 248 | 242 | 250 |
|-----|-----|-----|-----|
| 192 | 183 | 254 | 246 |
| 247 | 191 | 181 | 249 |
| 255 | 244 | 193 | 185 |

Array A5 (binary system)

| 10110100 | 11111000 | 11110010 | 11111010 |
|--------------|--------------|--------------|--------------|
| 11000000 | 10110111 | 11111110 | 11110110 |
| 11110111 | 10111111 | 10110101 | 11111001 |
| 11111111 | 11110100 | 11000001 | 10111001 |

Then, in Step S402, the downscaling unit 21 omits 4 LSB (marked gray in Table 3) from each element of the array A5 and retains 4 MSB in each element of the array A5 to form the array A1. In this embodiment, the array A1 is illustrated by Table 4.

TABLE 4

Array A1 (decimal system)

| 11 | 15 | 15 | 15 |
|----|----|----|----|
| 12 | 11 | 15 | 15 |
| 15 | 11 | 11 | 15 |
| 15 | 15 | 12 | 11 |

Array A1 (binary system)

| 1011 | 1111 | 1111 | 1111 |
|------|------|------|------|
| 1100 | 1011 | 1111 | 1111 |
| 1111 | 1011 | 1011 | 1111 |
| 1111 | 1111 | 1100 | 1011 |

Further, the edge unit 22 may generate the array A2 (Step S303) by performing the edge detection algorithm according to the input image array. For instance, the edge unit 22 may respectively compare each element of the input image array with a neighboring element thereof. For example, if one element in the input image array is identical to the neighboring elements thereof, e.g. the elements above, below, on the right, and on the left of the element, the corresponding element in the array A2 is set to 0; on the contrary, if the element in the input image array is not identical to one of the neighboring elements, the corresponding element in the array A2 is set to 1. Thereby, the array A2 as shown in Table 5 is obtained.

TABLE 5

Array A2 (binary system)

| 1 | 1 | 0 | 0 |
|---|---|---|---|
| 1 | 1 | 1 | 0 |
| 1 | 1 | 1 | 1 |
| 0 | 1 | 1 | 1 |

In view of the above, persons skilled in the art should know that the aforementioned edge detection algorithm is merely one embodiment of the present invention. In other embodiments, other kinds of edge detection algorithms may also be applied to dividing the elements into groups, so as to achieve effects similar to those of this embodiment.

It should be noted that each element of the input image array is 8 bits. Hence, a total data size of the input image array is 8×16=128 bits. After the input image array is compressed, the arrays A1 and A2 are obtained. Each element of the array A1 is 4 bits. Therefore, a total data size of the array A1 is 4×16=64 bits. Each element of the array A2 is 1 bit. Hence, a total data size of the array A2 is 1×16=16 bits. It is to say that, in this embodiment, a data size of 128−(64+16)=48 bits is saved after the input image array is compressed to obtain the arrays A1 and A2. A compression ratio thereof is 37.5%.

The encoder 20 may repeat Steps S301~S303 accordingly to compress each block in the frame into the arrays A1 and A2. Thereby, the storage unit 40 does not need to store the input image array having large data size but only needs to store the arrays A1 and A2. Consequently, the costs of the storage unit 40 are greatly reduced. Further, the steps of image decompression are described in detail in the following paragraphs.

Referring to FIGS. 2 and 3, the step of computing an element in Row 2 and Column 2 of the output image array is explained first in this embodiment. First, in Step S304, the upscaling unit 31 generates the array A3 according to the array A1, so that the bits of each element of the array A3 are equal to the bits of each element of the input image array. For example, FIG. 5 illustrates the steps of generating a third array based on the first array according to the first embodiment of the present invention. Referring to FIGS. 2, 3, and 5, starting from Step S501, the upscaling unit 31 generates the MSB of each element of the array A3 according to each element of the array A1. Thereafter, in Step S502, the upscaling unit 31 generates the LSB of each element of the array A3 according to an array A6 (not shown). In other words, in Steps S501 and S502, the upscaling unit 31 may use each element of the array A1 as the MSB of the array A3 and use each element of the array A6 as the LSB of the array A3 (marked gray in Table 7), so as to obtain the array A3 in Table 7.

TABLE 6

Array A6 (binary system)

| 0000 | 0000 | 0000 | 0000 |
|------|------|------|------|
| 0000 | 0000 | 0000 | 0000 |
| 0000 | 0000 | 0000 | 0000 |
| 0000 | 0000 | 0000 | 0000 |

TABLE 7

Array A3 (decimal system)

| 176 | 240 | 240 | 240 |
|-----|-----|-----|-----|
| 192 | 176 | 240 | 240 |
| 240 | 176 | 176 | 240 |
| 240 | 240 | 192 | 176 |

Array A3 (binary system)

| 10110000 | 11110000 | 11110000 | 11110000 |
|--------------|--------------|--------------|--------------|
| 11000000 | 10110000 | 11110000 | 11110000 |
| 11110000 | 10110000 | 10110000 | 11110000 |
| 11110000 | 11110000 | 11000000 | 10110000 |

Following that, in Step S305, the selection unit 32 selects a group of elements of the array A3 according to the array A2.

Then, in Step S306, the computing unit 33 computes an average value of the group of elements selected by the selection unit 32, so as to obtain an element of an output image array. Detailed descriptions of Steps S305 and S306 are respectively provided below.

The elements having the same value in the array A2 indicate that the corresponding elements thereof in the input image array have higher similarity. Hence, in Step S305, the selection unit 32 may exclude the elements which may cause overly large error according to the array A2. Because a value of the element in the array A2 corresponding to the element in Row 2 and Column 2 of the output image array is 1, the selection unit 32 may select the elements of the array A3 corresponding to the elements having a value of 1 in the array A2 to serve as the group of elements G1. Such a process has the advantage of improving the quality of the output image array. The group of elements G1 in this embodiment is detailed in Table 8.

TABLE 8

| Group of elements G1 (decimal system) | | | |
|---|---|---|---|
| 176 | 240 | | |
| 192 | 176 | 240 | |
| 240 | 176 | 176 | 240 |
| | 240 | 192 | 176 |
| Group of elements G1 (binary system) | | | |
| 10110000 | 11110000 | | |
| 11000000 | 10110000 | 11110000 | |
| 11110000 | 10110000 | 10110000 | 11110000 |
| | 11110000 | 11000000 | 10110000 |

To further improve the quality of a decompressed image, the selection unit 32 may further exclude elements which may cause overly large error in Step S305. For instance, in order to compute the element in Row 2 and Column 2 of the output image array, each element in the group of elements G1 may be respectively compared with an element in Row 2 and Column 2 (marked gray in Table 8) of the group of elements G1. If a discrepancy exceeds a predetermined value, the corresponding element would be omitted, so as to select a group of elements G2 from the group of elements G1.

In view of the above, a method for defining the predetermined value is provided here for reference, but the present invention is not limited thereto. Any persons skilled in the art may define a predetermined value to meet their requirements. In this embodiment, the downscaling unit 21 omits 4 LSB from each element of the array A5, and a corresponding value thereof is 16 (decimal system). Hence, an error range of each element is between 0~16. In other words, if the discrepancy between two elements is smaller than or equal to 16, the two elements are highly similar; on the contrary, if the discrepancy is larger than 16, the two elements have very low similarity. Therefore, the predetermined value is set to 16 in this embodiment. According to the aforesaid steps, the group of elements G2, shown in Table 9, is selected from the group of elements G1.

TABLE 9

| Group of elements G2 (decimal system) | | | |
|---|---|---|---|
| 176 | | | |
| 192 | 176 | | |
| | 176 | 176 | |
| | | 192 | 176 |

TABLE 9-continued

| Group of elements G2 (binary system) | | | |
|---|---|---|---|
| 10110000 | | | |
| 11000000 | 10110000 | | |
| | 10110000 | 10110000 | 11110000 |
| | | 11000000 | 10110000 |

Thereafter, referring to Step S306, the computing unit 33 computes an average value of the group of elements G2 to obtain the result that the element in Row 2 and Column 2 of the output image array equals to (176×5+192×2)÷7≈180. In comparison with the element in Row 2 and Column 2 of the input image array, the discrepancy is 0. Accordingly, the decoder 30 may obtain each element of the output image array to constitute the output image array by repeating Steps S304~S306. Based on the above, it is known that the image decompression method disclosed in this embodiment helps to greatly reduce the error between the output image array and the input image array, and thereby improve the quality of the decompressed image. To conclude, this embodiment not only helps to save a large capacity of the storage unit 40 but also maintains the quality of the decompressed image.

The input image array illustrated in the first embodiment is a 4×4 array, but the present invention is not limited thereto. For example, an array size of the input image array may be defined by the number of the LSB omitted by the downscaling unit 21 from each element of the array A5. For instance, if the downscaling unit 21 omits 4 LSB from each element of the array A5, the number of the elements of the input image array may be $2^4$, i.e. 16. That is to say, the array size of the input image array may be 4×4, 2×8, or 1×16. In addition, if the downscaling unit 21 omits 3 LSB from each element of the array A5, the number of the elements of the input image array may be $2^3$, i.e. 8. That is to say, the array size of the input image array may be 4×2 or 1×8.

It is noted that, although the above embodiment has disclosed a possible type of an image compression/decompression device and a method thereof, it is common sense to persons skilled in the art that different manufacturers may develop different designs of image compression/decompression devices and methods, and the application of the present invention should not be limited to this type only. In another word, the spirit of the present invention lies in that, during the compression process, the first array is generated according to the input image array, and the second array is generated by performing the edge detection algorithm according to the input image array. Moreover, during the decompression process, each element of the third array is generated according to the first array, and a group of elements of the third array is selected according to the second array. Then, an average value of the group of elements is computed to obtain the element of the output image array. To further explain the spirit of the present invention and help persons skilled in the art to practice the present invention, other embodiments are provided in the following paragraphs.

Second Embodiment

Figure 6:
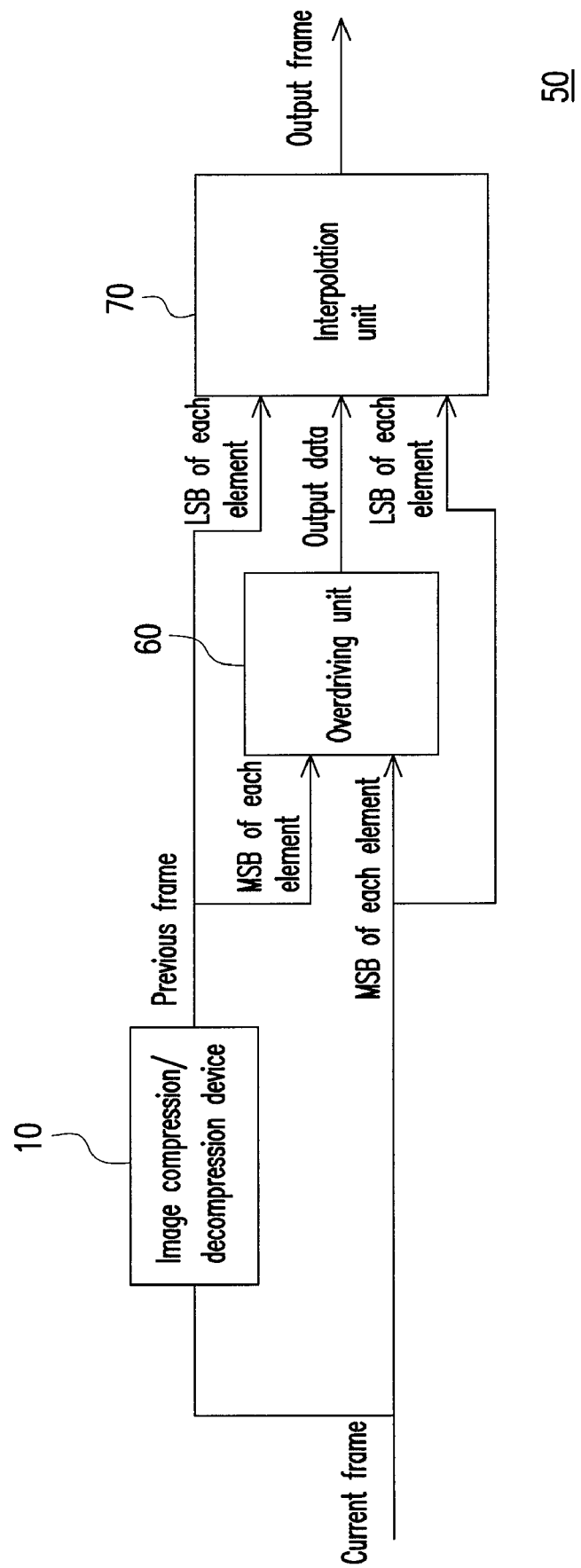
FIG. 6 illustrates a schematic view of an overdriving device of a liquid crystal display according to the second embodiment of the present invention.

Persons skilled in the art may apply the image compression/decompression device disclosed in the first embodiment to any types of storage units used for storing image data. For example, FIG. 6 illustrates a schematic view of an overdriving device of a liquid crystal display according to the second embodiment of the present invention. Referring to FIGS. 6 and 2, an overdriving device 50 in this embodiment comprises the image compression/decompression device 10 in FIG. 2, an overdriving unit 60, and an interpolation unit 70, wherein the descriptions of the image compression/decompression device 10 are provided in the first embodiment. The use of the image compression/decompression device 10 has the advantages that the storage capacity is saved, and the MSB and LSB of each element of a previous frame are separately provided to the overdriving unit 60 and the interpolation unit 70.

Based on the above, the overdriving unit 60 may generate output data according to the MSB of each element of a current frame, the MSB of each element of the previous frame, and a lookup table. The interpolation unit 70 then computes an output frame according to the output data, the LSB of each element of the frame of the current period, and the LSB of each element of the previous frame. It is noted that the use of the interpolation unit 70 has the advantages that the lookup table process of the overdriving unit 60 may be simplified to reduce costs and further to generate proper output frames for improving liquid crystal responding time. Therefore, the overdriving device 50 in this embodiment not only helps to avoid the high costs of adopting storage unit with large capacity but also effectively improves the liquid crystal responding time of the LCD.

Third Embodiment

Figure 7:
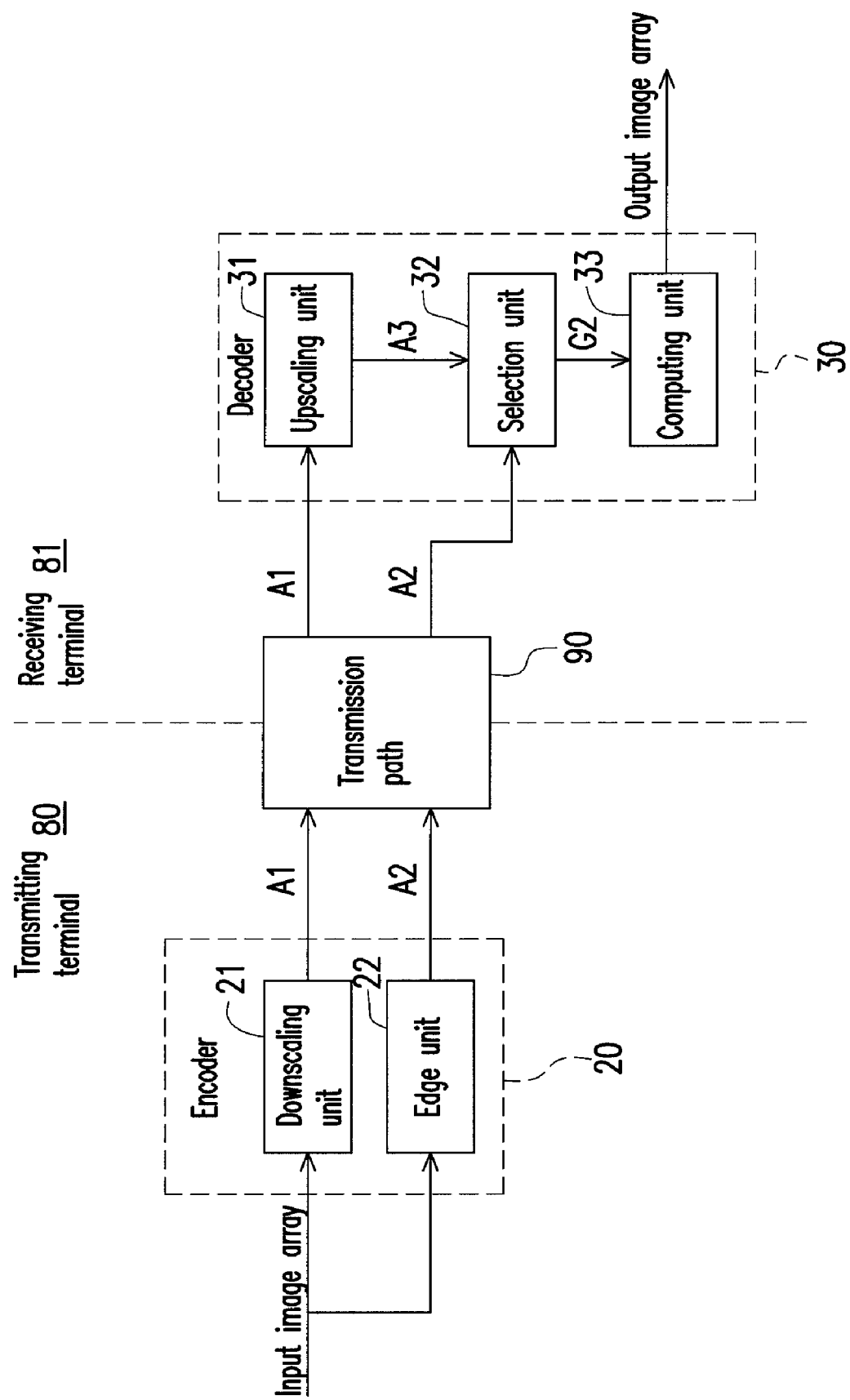
FIG. 7 illustrates a schematic view of an image compression/decompression device applicable to a transmission system according to the third embodiment of the present invention.

Persons skilled in the art may apply the encoder and decoder disclosed in the first embodiment to any types of image transmission paths for reducing the data size of the transmitted image. For instance, FIG. 7 illustrates a schematic view of an image compression/decompression device applicable to a transmission system according to the third embodiment of the present invention. Referring to FIGS. 7 and 2, descriptions for the elements with the same reference numbers could be found in the above embodiments. It is noted that, in this embodiment, the encoder 20 is disposed at a transmitting terminal 80 and the decoder 30 is disposed at a receiving terminal 81. The transmitting terminal 80 may use the encoder 20 to compress the input image array into the arrays A1 and A2, so as to reduce the data size of the image. Then, a transmission path 90 transmits the arrays A1 and A2 to the decoder 30 at the receiving terminal 81. In this embodiment, Internet may serve as the transmission path 90, but the present invention is not limited thereto. In other embodiments, the transmission path 90 could be a 3G (third generation) mobile communication system or so forth. The decoder 30 then decompresses the arrays A1 and A2 into the input image array. Thereby, the data transmitted via the transmission path 90 is greatly reduced.

To sum up, in the present invention, during the compression process, the first array is generated according to the input image array, and the second array is generated by performing the edge detection algorithm according to the input image array. Additionally, during the decompression process, each element of the third array is generated according to the first array. Then, a group of elements of the third array is selected according to the second array, and an average value of the group of elements is computed to obtain the element of the output image array. Hence, the quality of the decompressed image is improved. Furthermore, the embodiments of the present invention at least have the following advantages:

1. The image compression/decompression device is applied in the storage device to greatly save the storage capacity.
2. The image compression/decompression device is applied in the transmission system to greatly reduce the transmission data.

Although the present invention has been disclosed by the above embodiments, they are not intended to limit the present invention. Anybody skilled in the art may make modifications and variations without departing from the spirit and scope of the present invention. Therefore, the protection range of the present invention falls within the appended claims.

What is claimed is:

1. An image compression or decompression method, comprising:
    generating a first array according to an input image array;
    generating a second array by performing an edge detection algorithm according to the input image array;
    generating a plurality of elements of a third array according to the first array;
    selecting a group of elements of the third array according to the second array; and
    computing, using an image processing device, an average value of the group of elements to obtain an element of an output image array,
    wherein a plurality of elements of the input image array are M bits, the elements of the third array are M bits, a plurality of elements of the first array are N bits, M and N are natural numbers, and M is larger than N.

2. The image compression or decompression method according to claim 1, wherein the step of generating the first array according to the input image array comprises:
    performing an addition operation on the input image array and a fourth array to obtain a fifth array; and
    generating the first array according to N most significant bits of a plurality of elements of the fifth array,
    wherein a plurality of elements of the fourth array are (M−N) bits and the elements of the fifth array are M bits.

3. The image compression or decompression method according to claim 1, wherein a plurality of elements of the second array is one bit.

4. The image compression or decompression method according to claim 1, wherein the step of generating the elements of the third array according to the first array comprises:
    generating N most significant bits of the elements of the third array according to the first array; and
    generating M−N least significant bits of the elements of the third array according to a sixth array.

5. The image compression or decompression method according to claim 1, wherein the step of selecting the group of elements of the third array according to the second array comprises:
    excluding each corresponding element from the group of elements when a discrepancy between each element of the third array and a specific element of the third array reaches a predetermined value, wherein the specific element corresponds to the element of the output image array.

6. The image compression or decompression method according to claim 5, wherein the predetermined value is $2^{(M-N)}$.

7. The image compression or decompression method according to claim 1, wherein the numbers of the elements of the input image array, the first array, the second array, and the third array are $2^{(M-N)}$.

8. An image compression or decompression device, comprising:
    an encoder receiving an input image array, comprising:
        a downscaling unit generating a first array according to the input image array; and
        an edge unit generating a second array by performing an edge detection algorithm according to the input image array; and a decoder receiving the first array and the second array, comprising:

an upscaling unit generating a plurality of elements of a third array according to the first array;

a selection unit, coupled to the upscaling unit, selecting a group of elements of the third array according to the second array; and a computing unit, coupled to the selection unit, computing an average value of the group of elements to obtain an element of an output image array, wherein a plurality of elements of the input image array are M bits, the elements of the third array are M bits, a plurality of elements of the first array are N bits, M and N are natural numbers, and M is larger than N.

9. The image compression or decompression device according to claim 8, further comprising:

a storage unit, coupled to the encoder and the decoder, storing the first array and the second array output by the encoder and providing the first array and the second array to the decoder.

10. The image compression or decompression device according to claim 8, further comprising:

a transmission path, coupled to the encoder and the decoder, transmitting the first array and the second array provided by the encoder to the decoder.

11. The image compression or decompression device as according to claim 8, wherein the downscaling unit performs an addition operation on the input image array and a fourth array to obtain a fifth array, and generates the first array according to N most significant bits of a plurality of elements of the fifth array, wherein a plurality of elements of the fourth array are (M−N) bits and the elements of the fifth array are M bits.

12. The image compression or decompression device according to claim 8, wherein the upscaling unit generates N most significant bits of the elements of the third array according to the first array, and generates M−N least significant bits of the elements of the third array according to a sixth array.

13. The image compression or decompression device according to claim 8, wherein the selection unit excludes each corresponding element from the group of elements when a discrepancy between each element of the third array and a specific element of the third array reaches a predetermined value, wherein the specific element corresponds to the element of the output image array.

* * * * *